United States Patent
Okuda

(10) Patent No.: US 6,950,589 B2
(45) Date of Patent: Sep. 27, 2005

(54) OPTICAL SWITCHING ELEMENT AND METHOD FOR MANUFACTURING THE SAME

(75) Inventor: Shoji Okuda, Kasugai (JP)

(73) Assignee: Fujitsu Limited, Kawaski (JP)

(*) Notice: Subject to any disclaimer, the term of this patent is extended or adjusted under 35 U.S.C. 154(b) by 180 days.

(21) Appl. No.: 10/388,419

(22) Filed: Mar. 17, 2003

(65) Prior Publication Data

US 2003/0180028 A1 Sep. 25, 2003

(30) Foreign Application Priority Data

Mar. 19, 2002 (JP) ........................................ 2002-077130
Feb. 26, 2003 (JP) ........................................ 2003-049867

(51) Int. Cl.$^7$ ................................................ G02B 6/10
(52) U.S. Cl. ........................................ 385/129; 385/14
(58) Field of Search ................................ 385/129–132, 385/142, 14; 216/2, 39, 60; 438/31, 740

(56) References Cited

U.S. PATENT DOCUMENTS

| | | | | |
|---|---|---|---|---|
| 5,827,370 A | * | 10/1998 | Gu ............................. | 118/175 |
| 6,020,111 A | * | 2/2000 | Mihara ....................... | 430/318 |
| 6,194,036 B1 | * | 2/2001 | Babayan et al. ............ | 427/563 |
| 6,580,864 B1 | * | 6/2003 | Temkin et al. .............. | 385/132 |
| 6,730,988 B2 | * | 5/2004 | Leon et al. .................. | 257/618 |
| 6,768,828 B2 | * | 7/2004 | Gill et al. ..................... | 385/14 |
| 6,768,855 B1 | * | 7/2004 | Bakke et al. ................ | 385/129 |
| 2003/0118309 A1 | * | 6/2003 | Uno ............................ | 385/129 |
| 2003/0176002 A1 | * | 9/2003 | Zhang et al. ................ | 438/22 |
| 2004/0042751 A1 | * | 3/2004 | Blalock et al. ............. | 385/129 |

FOREIGN PATENT DOCUMENTS

JP     09080247 A    3/1997

OTHER PUBLICATIONS

R. M. de Ridder et al. Silicon oxynitride planar waveguiding structures for application in optical communication. IEEE Journal of Selected Topics in Quantum Electronics, vol.4 No. 6, pp. 930–937, Nov./Dec. 1998.*

E. Fluck et al. Compact versatile thermooptical space switch based on beam steering by a waveguide array. IEEE Photonics Technology Letters, vol. 11 No. 11, pp. 1399–1401, Nov. 1999.*

B. J. Offrein et al. Tunable WDM add/drop components in silicon–oxynitride waveguide technology. 1999 Electronic Components and Technology Conference, pp. 19–25, Jun. 1999.*

I. Shubin et al. Electrostatically actuated 1×2 micro–mechanical optic switch. Electronics Letters, vol. 37 No. 7, pp. 451–452, Mar. 2001.*

* cited by examiner

Primary Examiner—Rodney Bovernick
Assistant Examiner—Mike Stahl
(74) Attorney, Agent, or Firm—Westerman, Hattori, Daniels, and Adrian LLP

(57) ABSTRACT

A lower clad, cores, and an upper clad are formed by a chemical vapor deposition method (CVD method). At least one of the additional amount of oxygen, the additional amount of nitrogen, and the additional amount of silicon of a silicon oxynitride film is adjusted so that the cores have a desired higher refractive index than those of the clads. Further, end point detectors are formed which become etching stoppers of dry etching in pattern forming the cores.

32 Claims, 14 Drawing Sheets

DIAGRAM OF STATE AFTER FORMATION OF OPTICAL SWITCHING
ELEMENTS AS SEEN FROM TOP AND CROSS SECTION
REGIONS SURROUNDED BY CIRCLES INCLUDE OXIDE FILM AND
MARKERS FOR EPDS IN FORMING ELEMENTS

FORM DESIRED RESIST PATTERNS

APPLY RESIST IN ACCORDANCE WITH SHAPES
OF SWITCHING ELEMENTS TO FORM DESIRED
RESIST PATTERNS AFTER EXPOSURE AND DEVELOPMENT

REMOVE BY ETCHING OXIDE FILM AND
MARKERS FOR EPDS OUTSIDE SWITCHING ELEMENT REGIONS

DICING

42

PERFORM DICING ALONG SCRIBES

RESPECTIVE SWITCHING ELEMENTS AFTER SEPARATION

SEPARATE RESPECTIVE ELEMENTS BY DICING AFTER REMOVING OXIDE FILM AND MARKERS BETWEEN RESPECTIVE ELEMENTS

OPTICAL SWITCHING ELEMENT AND METHOD FOR MANUFACTURING THE SAME

CROSS-REFERENCE TO RELATED APPLICATIONS

This application is based upon and claims the benefit of priority from the prior Japanese Patent Application Nos. 2002-077130, filed on Mar. 19, 2002, and 2003-49867, filed on Feb. 26, 2003, the entire contents of which are incorporated herein by reference.

BACKGROUND OF THE INVENTION

1. Field of the Invention

The present invention relates to an optical switching element, which is to be formed on a semiconductor substrate using a semiconductor process technology and has an optical function corresponding to an optical fiber, and a method for manufacturing the same.

2. Description of the Related Art

Conventionally, when manufacturing an optical switching element, a row material gas such as $SiCl_4$ is flowed into an oxygen-hydrogen burner to cause oxidation reaction in flames by a flame hydrolysis deposition method to deposit on a silicon substrate a lower clad and a core material as a glass particle layer. To the core material, an impurity such as $TiO_2$ or $GeO_2$ is added to change its refractive index. Then, heat treatment is performed at 1200° C. or higher to bring glass particles into close contact with each other, and the core material is patterned to form cores in desired shapes. Thereafter, an upper clad is deposited to cover the cores by the flame hydrolysis deposition method and is heat-treated at 1200° C. or higher, thus forming the optical switching element.

However, when depositing the core material by the above-mentioned flame hydrolysis deposition method, there is a problem that a large variation in impurity diffusion in the core material causes nonuniform refractive indexes and also nonuniform thickness distribution in a film to be deposited.

There is another problem that when the cores are pattern formed on the lower clad, the lower clad is also etched during formation of the cores because the lower clad and the core material, which are made of almost the same materials, have a small etching speed difference to present an insufficient selection ratio, and as a result, cores in desired shapes cannot be obtained. In particular, side walls of the cores might be formed into not vertical faces but coarse faces with trailing skirts, which causes attenuation of light.

SUMMARY OF THE INVENTION

Hence, the present invention is made in view of the above-described problems, and it is an object of the present invention to enable formation of a core with a desired uniform refractive index and achievement of a desired refractive index difference between the core and a clad with ease and accuracy so as to provide a highly reliable optical switching element and a method for manufacturing the same.

It is another object of the present invention to enable pattern formation of a core on a lower clad with ease and accuracy even when the clad and the core are made of similar materials so as to provide a highly reliable optical switching element and a method for manufacturing the same.

As a result of earnest studies, the inventor of the present invention has devised the following aspects of the invention.

An optical switching element of the present invention includes a clad formed on a semiconductor substrate; and cores covered with the clad and made to have a higher refractive index than that of the clad to form optical paths, wherein the cores are formed of a silicon oxynitride and are controlled to have a desired refractive index by adjusting at least one of an additional amount of oxygen, an additional amount of nitrogen, and an additional amount of silicon.

Another aspect of the optical switching element of the present invention includes a clad formed on a semiconductor substrate; and cores covered with the clad and made to have a higher refractive index than that of the clad to form optical paths, wherein the clad has a lower clad and an upper clad so that the upper clad covers the cores formed on the lower clad, and the lower clad has in a surface layer thereof etching stoppers made of a material different from that of the lower clad.

A method for manufacturing an optical switching element of the present invention includes a first step of forming a lower clad on a semiconductor substrate by a chemical vapor deposition method; a second step of forming cores becoming optical paths by depositing a core material on the lower clad by the chemical vapor deposition method and processing the core material; and a third step of forming an upper clad to cover the cores by the chemical vapor deposition method, wherein in the second step, the cores are formed and controlled to have a desired refractive index being a higher refractive index than those of the lower clad and the upper clad by the chemical vapor deposition method with a flow rate of a source gas being adjusted.

Another aspect of the method for manufacturing an optical switching element includes a first step of forming a lower clad on a semiconductor substrate; a second step of forming in a surface layer of the lower clad etching stoppers made of a material different from that of the lower clad; a third step of forming cores becoming optical paths with a higher refractive index than those of the lower clad and an upper clad by depositing a core material on the lower clad and processing the core material using the etching stoppers as a reference of etching; and a fourth step of forming the upper clad to cover the cores.

DETAILED DESCRIPTION OF THE PREFERRED EMBODIMENTS

Hereinafter, a preferred embodiment to which the present invention is applied will be described in detail with reference to the drawings.

(Specific Embodiment)

General Configuration of Optical Switching Element

Figure 1:
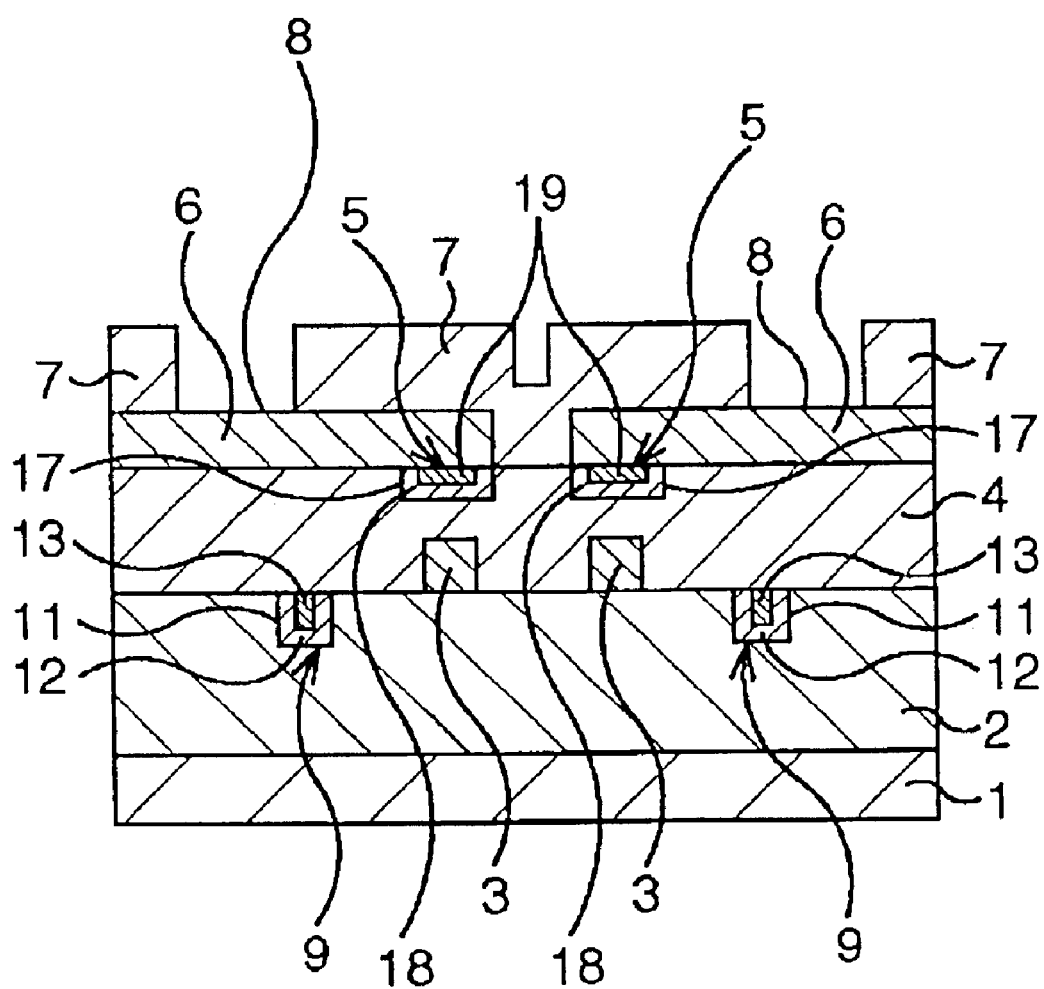
FIG. 1 is a schematic cross-sectional view showing a general configuration of an optical switching element according to this embodiment.

FIG. 1 is a schematic cross-sectional view showing a general configuration of an optical switching element according to this embodiment.

This optical switching element includes a silicon semiconductor substrate 1; a lower clad 2 made of a silicon oxide film on the silicon semiconductor substrate 1; cores 3 each made of a silicon oxide film and pattern formed on the lower clad 2 to form an optical path; an upper clad 4 made of a silicon oxide film formed on the lower clad 2 to cover the cores 3; heaters 5 each constituted of TiN and W sequentially embedded in a recess formed at a portion of a surface layer of the upper clad 4 corresponding to a position above the core 3; electric power supply wirings 6 for supplying electric power to the heaters 5; a cover film 7 formed with external electric power supply apertures 8 for connecting to the electric power supply wirings 6.

In the surface layer of the lower clad 2 here, end point detectors 9 (hereafter simply referred to as EPDs 9) are formed which are etching stoppers for dry etching during pattern formation of the cores 3 as described later. The EPD 9 is constituted of TiN and W sequentially embedded in the recess formed in the surface layer of the lower clad 2.

In this optical switching element, the lower clad 2, the cores 3, and the upper clad 4 are formed by a chemical vapor deposition method (CVD method), more specifically, a plasma enhanced CVD method or a thermal CVD method, with at least one of the additional amount of oxygen, the additional amount of nitrogen, and the additional amount of silicon in the silicon oxynitride film being adjusted so that the cores 3 have a desired higher refractive index than those of the clads 2 and 4. Further, it is also adoptable to add boron or phosphorus as an impurity here to adjust the refractive indexes of the cores 3. Since the cores 3 have a higher refractive index than those of the clads 2 and 4 surrounding the cores 3, light incident on the cores 3 passes through the cores 3 while being reflected. To change optical paths between adjacent cores 3, a heater 5 heats a core 3 to thermally expand it for a change in the refractive index, thus changing an optical path thereof.

Method for Manufacturing Optical Switching Element

FIGS. 2A to 2C, FIGS. 3A to 3D, FIGS. 4A to 4c, FIGS. 5A to 5c, FIGS. 6A to 6c, FIGS. 7A and 7B are schematic cross-sectional views showing in the order of steps a method for manufacturing the optical switching element according to this embodiment.

Figure 2A:
FIGS. 2A to 2C are schematic cross-sectional views showing in the order of steps a method for manufacturing the optical switching element according to this embodiment.

To manufacture the optical switching element of this embodiment, first, as shown in FIG. 2A, a silicon oxide film is deposited to a film thickness of about 15 $\mu$m on the silicon semiconductor substrate 1 by the plasma enhanced CVD method or the thermal CVD method to form the lower clad 2. The refractive index of the lower clad 2 here is made about 1.46.

Figure 2B:
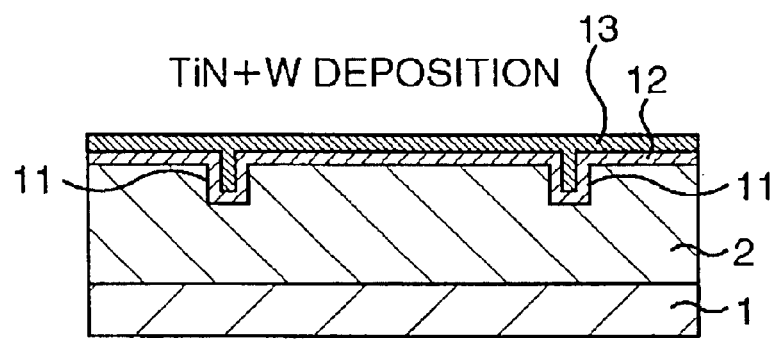

Subsequently, as shown in FIG. 2B, recesses 11 (vias or grooves) are pattern formed to a depth of about 0.4 $\mu$m in the surface layer of the lower clad 2. Metal thin films, layered films of a TiN film 12 and a W film 13 here, are deposited on the lower clad 2 to fill in the recesses 11. In place of using TiN and W as the metal thin films, it is also adoptable to use Cu, Ti, and Al or combine these with TiN and W to form the films.

Figure 2C:
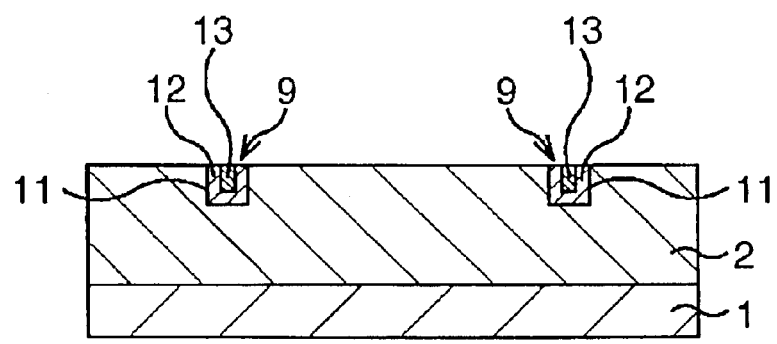

Subsequently, as shown in FIG. 2C, the TiN film 12 and the W film 13 are flattened by a CMP (Chemical Mechanical Polishing) method with the surface of the lower clad 2 as a stopper to form the EPDs 9 composed of the TiN film 12 and the W film 13 filled only in the recesses 11.

Figure 3A:
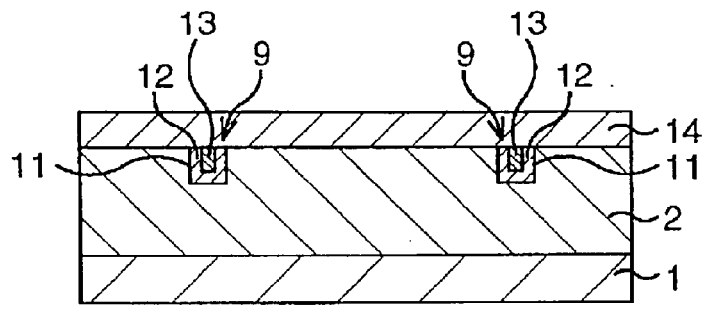
FIGS. 3A to 3D are schematic cross-sectional views showing in the order of steps the method for manufacturing the optical switching element according to this embodiment subsequent to FIGS. 2A to 2C.

Subsequently, as shown in FIG. 3A, a silicon oxynitride film 14 becoming a core material is deposited to a film thickness of about 1.5 $\mu$m by the plasma enhanced CVD method using high density plasma on the lower clad 2 with the EPDs 9 formed in its surface layer. In this event, the silicon oxynitride film 14 is controlled to have a desired higher refractive index than those of the clads 2 and 4, about 1.51 here by adjusting the flow rate of at least one of a gas contributing to addition of oxygen, a gas contributing to addition of nitrogen, and a gas contributing to addition of silicon of a source gas. As the source gas, a mixed gas of $SiH_4$, $N_2O$, and $N_2$ is used. In this case, $SiH_4$ is the gas contributing to addition of silicon, and $N_2O$ and $N_2$ are the gasses contributing to addition of oxygen and nitrogen. Here, $NO_2$, $O_2$, or $O_3$ gas may be used in place of $N_2O$.

In this case, TEOS ($Si(OC_2H_5)_4$) may be used in place of $SiH_4$ being a component of the mixed gas. It is also preferable to add at least one selected from impurities including boron or phosphorus, for example, $B_2H_6$, $B(OCH_3)_3$, $PH_3$, and $PO(OCH_3)_3$, $NH_3$, or the like in order to adjust the refractive index of the core material.

Subsequently, the silicon oxynitride film 14 is patterned to form the cores 3.

Figure 3B:
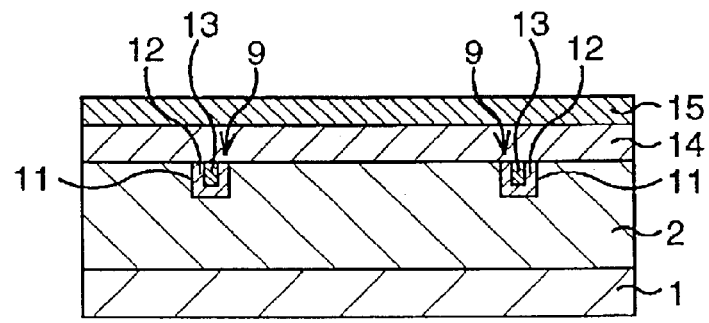

Specifically, first, as shown in FIG. 3B, a photoresist 15 is applied onto the lower clad 2.

Figure 3C:
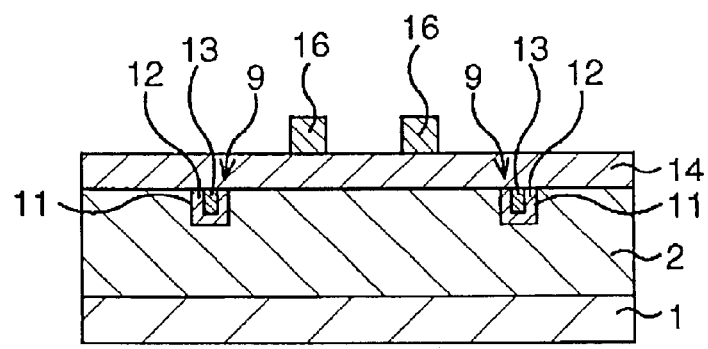

Then, as shown in FIG. 3C, the photoresist 15 is processed by photolithography to form resist masks 16 in the shapes of cores.

Then, the silicon oxynitride film 14 is etched by a plasma dry etching method with the resist masks 16 as masks to pattern form the cores 3 in desired shapes. Here, the EPDs 9 are used as etching stoppers during this etching. More specifically, after the silicon oxynitride film 14 at positions where the cores 3 are not to be formed is etched to expose the EPDs 9, plasma reaches the EPDs 9 to cause a change in intensity of light emission and light wavelength. By detecting this change, completion of the etching is recognized, and the etching is ended after over etching is further performed a little. This over etching is carried out to remove "holes", which tend to occur in the lower clad 2 that is formed by the plasma enhanced CVD method, and restrain the "holes" from coming into direct contact with the cores 3. This over etching can prevent attenuation of light.

Figure 3D:
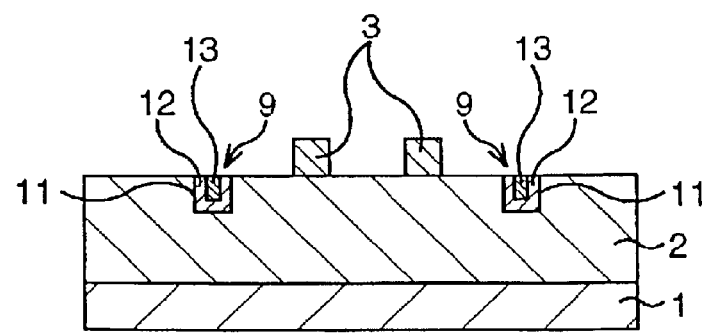

Then, as shown in FIG. 3D, the resist masks 16 are removed by ashing or the like to complete the cores 3. To remove hydrogen in the cores 3, a heat treatment is performed for about 30 minutes at 1100° C. in a nitrogen atmosphere. In this heat treatment, both heating and cooling are controlled at 20° C./min or less to prevent breakage of a wafer.

Subsequently, the upper clad 4, which is to be integrated with the lower clad 2 to cover the cores 3, is formed.

Figure 4A:
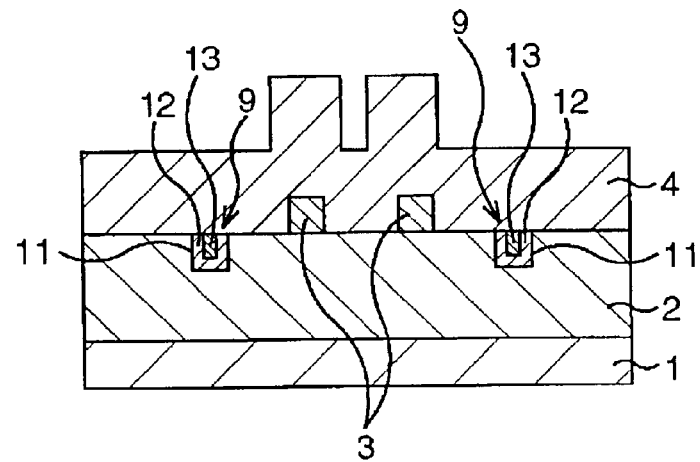
FIGS. 4A to 4C are schematic cross-sectional views showing in the order of steps the method for manufacturing the optical switching element according to this embodiment subsequent to FIGS. 3A to 3D.

Specifically, first, as shown in FIG. 4A, a silicon oxide film is deposited to cover the cores 3 by the plasma enhanced CVD method or the thermal CVD method, thus forming the upper clad 4. The refractive index of the upper clad 4 here is made about 1.46 similarly to the lower clad 2.

Figure 4B:
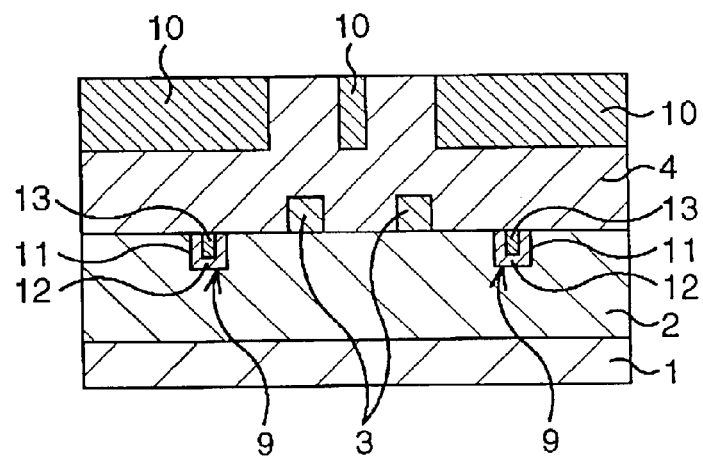
Figure 4C:
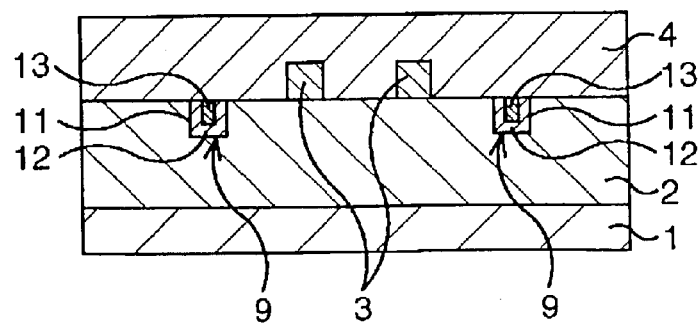

Next, since steps corresponding to the cores are generated on the surface of the upper clad 4, these steps are removed by the CMP method for flattening. In this event, if the steps are too large to be directly removed by the CMP method, it is only required that a photoresist 10 is applied to the surface of the upper clad 4 to embed the steps as shown in FIG. 4B, and in this state, the surface layer thereof is removed by a predetermined portion by dry etching or wet etching and thereafter flattened by the CMP method. In this manner, the steps are removed to form the upper clad 4 with the flattened surface as shown in FIG. 4C.

Figure 5A:
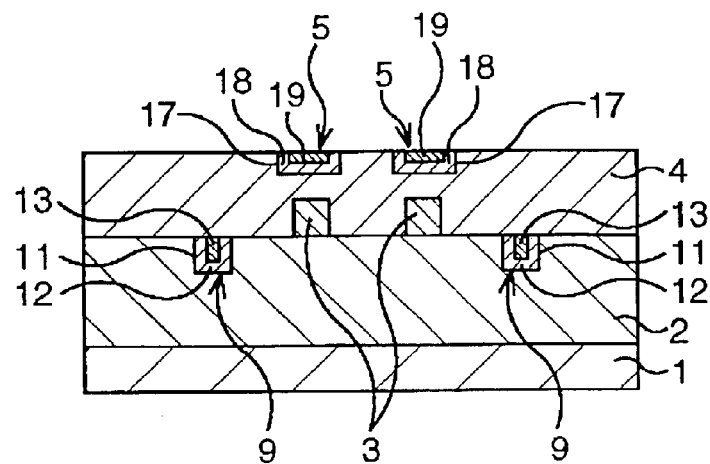
FIGS. 5A to 5C are schematic cross-sectional views showing in the order of steps the method for manufacturing the optical switching element according to this embodiment subsequent to FIGS. 4A to 4C.

Subsequently, as shown in FIG. 5A, the heaters 5 are formed in the surface layer of the upper clad 4.

Specifically, recesses 17 (vias or grooves) are pattern formed to a depth of about 0.15 μm at portions of the surface layer of the upper clad 4 corresponding to positions above the cores 3. Metal thin films, layered films of a TiN film 18 (about 50 nm in film thickness) and a W film 19 (about 100 nm in film thickness) here, are deposited on the upper clad 4 to fill in the recesses 17. The TiN film 18 and the W film 19 are flattened by the CMP method with the surface of the upper clad 4 as a stopper, thus forming the heaters 5 composed of the TiN film 18 and the W film 19 filled only in the recesses 17. It is also adoptable to pattern form the layered films of the TiN film 18 and the W film 19 as the heaters at the same positions on the upper clad 4 as those of the heaters 5.

Subsequently, the electric power supply wirings 6 for supplying electric power to the heaters 5 are pattern formed.

Figure 5B:
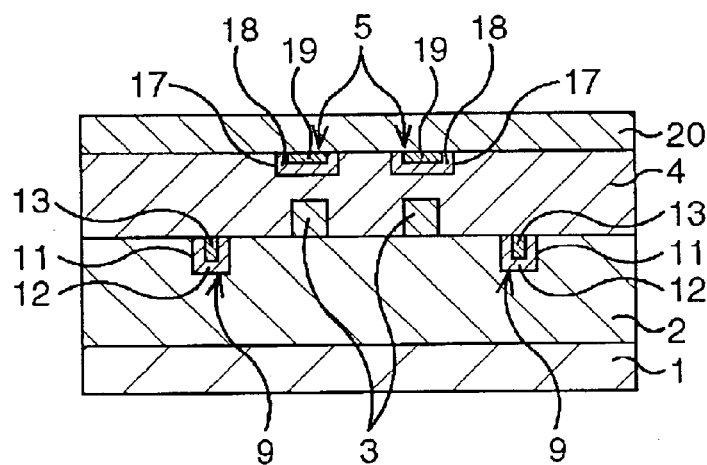

Specifically, first, as shown in FIG. 5B, a metal thin film 20 is formed by sequentially layering on the upper clad 4 metal thin films, a Ti film for connecting heaters (about 60 nm in film thickness), a TiN film (about 30 nm in film thickness), an Al—Cu film (about 1.0 μm in film thickness), and a TiN film for preventing reflection (about 100 nm in film thickness) here. The metal thin film may be formed here using a W film and a TiN film.

Figure 5C:
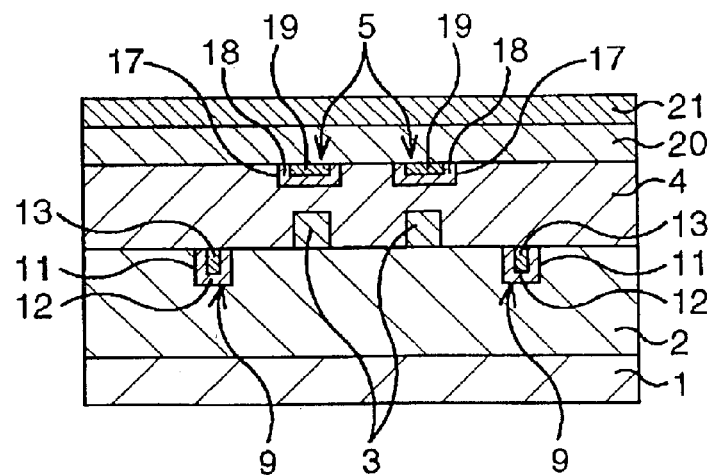
Figure 6A:
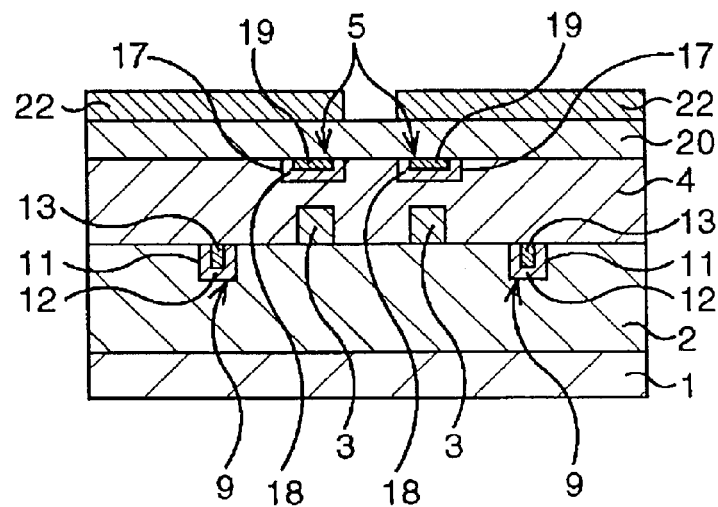
FIGS. 6A to 6C are schematic cross-sectional views showing in the order of steps the method for manufacturing the optical switching element according to this embodiment subsequent to FIGS. 5A to 5C.
Figure 6B:
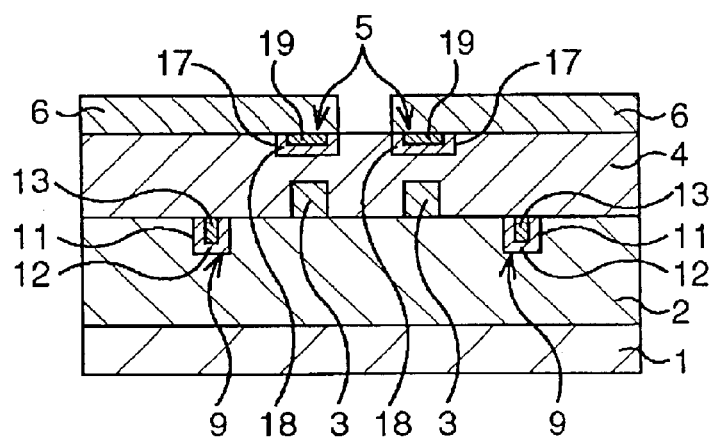

Next, as shown in FIG. 5C, a photoresist 21 is applied onto the metal thin film 20. Thereafter, as shown in FIG. 6A, the photoresist 21 is processed by photolithography into such a shape that the photoresist 21 is separated at a position corresponding to a portion of the metal thin film 20 between the heaters 5, thus forming resist masks 22. Then, with the resist masks 22 as masks, the metal thin film 20 is dry etched. Thereafter, as shown in FIG. 6B, the resist masks 22 are removed by ashing or the like to form the electric power supply wirings 6 to be connected to the heaters 5.

Figure 6C:
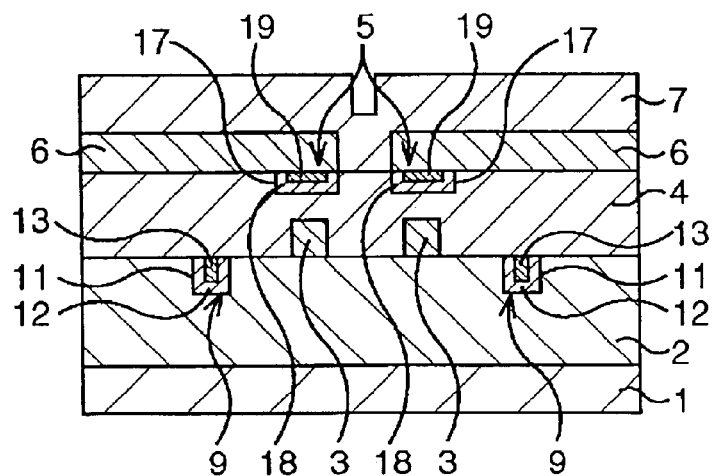

Subsequently, as shown in FIG. 6C, a silicon nitride film is deposited to a film thickness of about 500 nm by the plasma enhanced CVD method to cover the electric power supply wirings 6 to form the cover film 7.

Figure 7A:
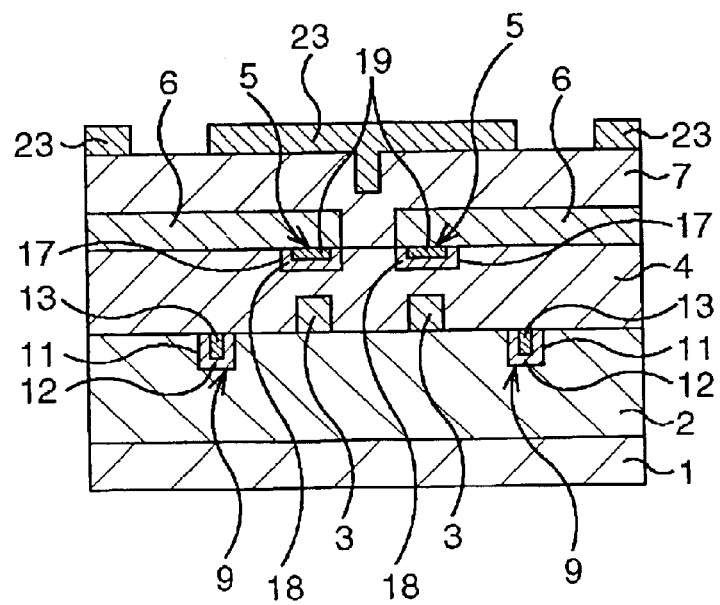
FIGS. 7A and 7B are schematic cross-sectional views showing in the order of steps the method for manufacturing the optical switching element according to this embodiment subsequent to FIGS. 6A to 6C.
Figure 7B:
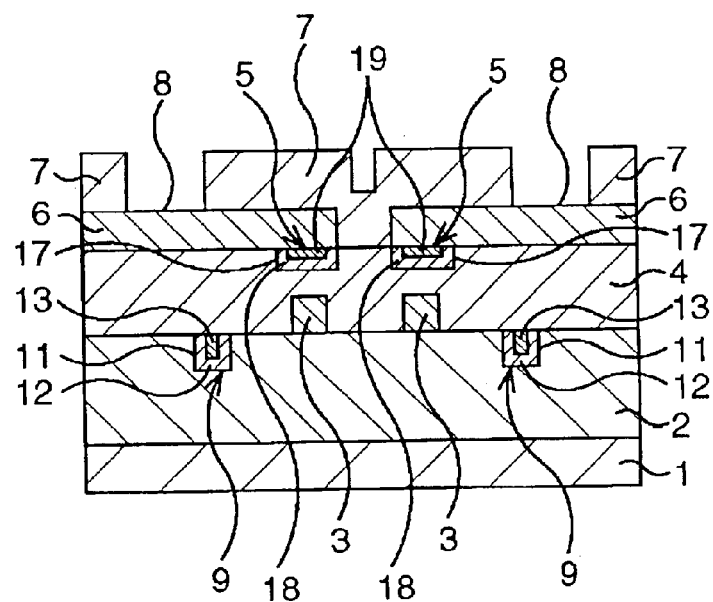

Subsequently, as shown in FIG. 7A, resist masks 23 are formed in shapes to expose predetermined portions of the cover film 7 corresponding to positions on the electric power supply wirings 6. With the resist masks 23 as masks, the cover film 7 is dry etched to expose respective portions of the surface of the electric power supply wirings 6. Thereafter, as shown in FIG. 7B, the resist masks 23 are removed by ashing or the like, thus completing the cover film 7 formed with the external electric power supply apertures 8.

Then, through formation of external wirings (not shown) to be connected to the electric power supply wirings 6 through the external electric power supply apertures 8, the optical switching element is completed.

Then, each optical switching element is cut out from the silicon semiconductor substrate 1.

Figure 8A:
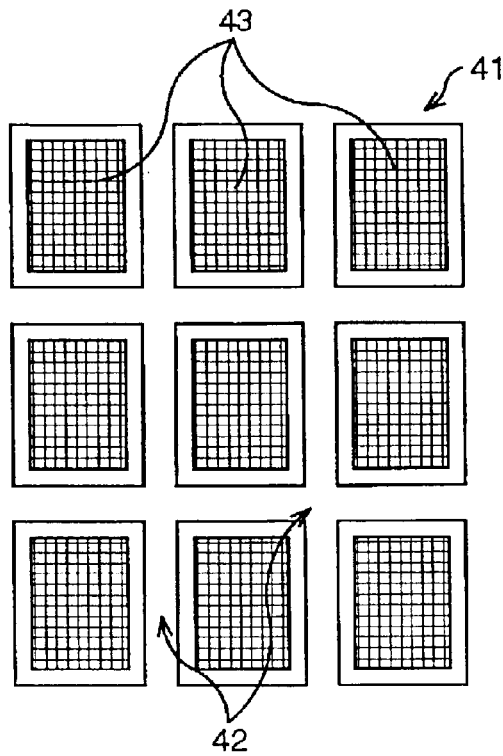
FIGS. 8A to 8C are block diagrams showing the state in which respective optical switching elements are cut out from a silicon semiconductor substrate.
Figure 8B:
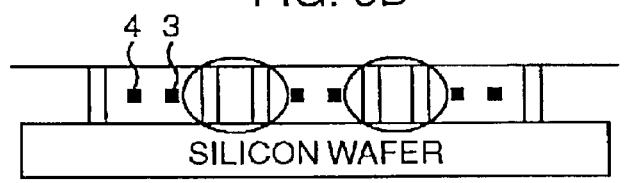
Figure 8C:
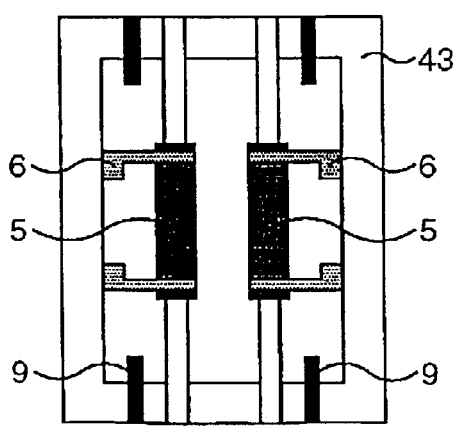
Figure 9A:
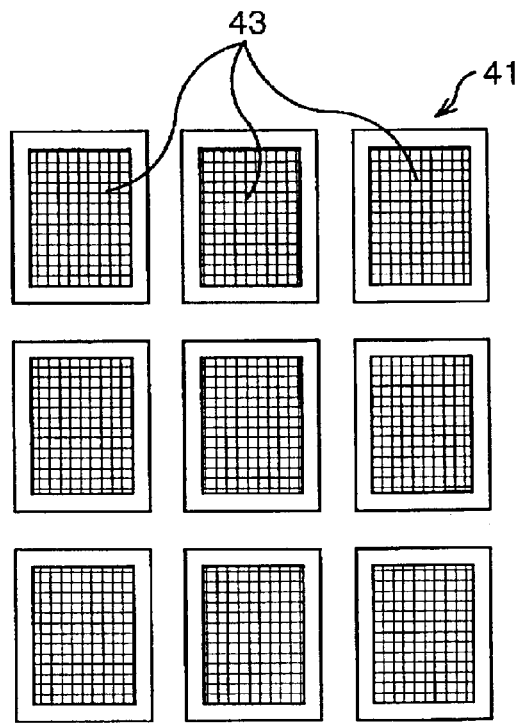
FIGS. 9A and 9B are block diagrams showing the state in which the respective optical switching elements are cut out from the silicon semiconductor substrate subsequent to FIGS. 8A to 8C.
Figure 9B:
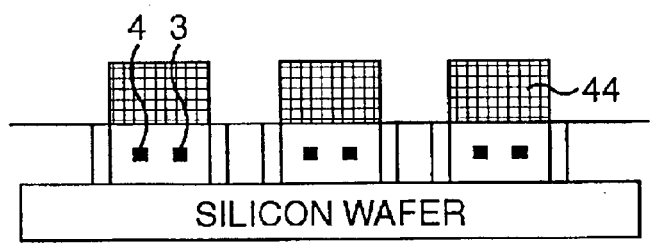

Specifically, first, optical switching elements 41 are formed in matrix form on the silicon semiconductor substrate 1, and portions between the optical switching elements 41 are made scribe regions 42 as shown in FIGS. 8A to 8C (FIG. 8A is a plane view, FIG. 8B is a cross-sectional view, and FIG. 8C is a plane view of one optical switching element enlarged). In the above state, resist masks 44 are formed in accordance with shapes of element regions 43 of the optical switching elements 41 as shown in FIGS. 9A and 9B (FIG. 9A is a plane view and FIG. 9B is a cross-sectional view).

Figure 10:
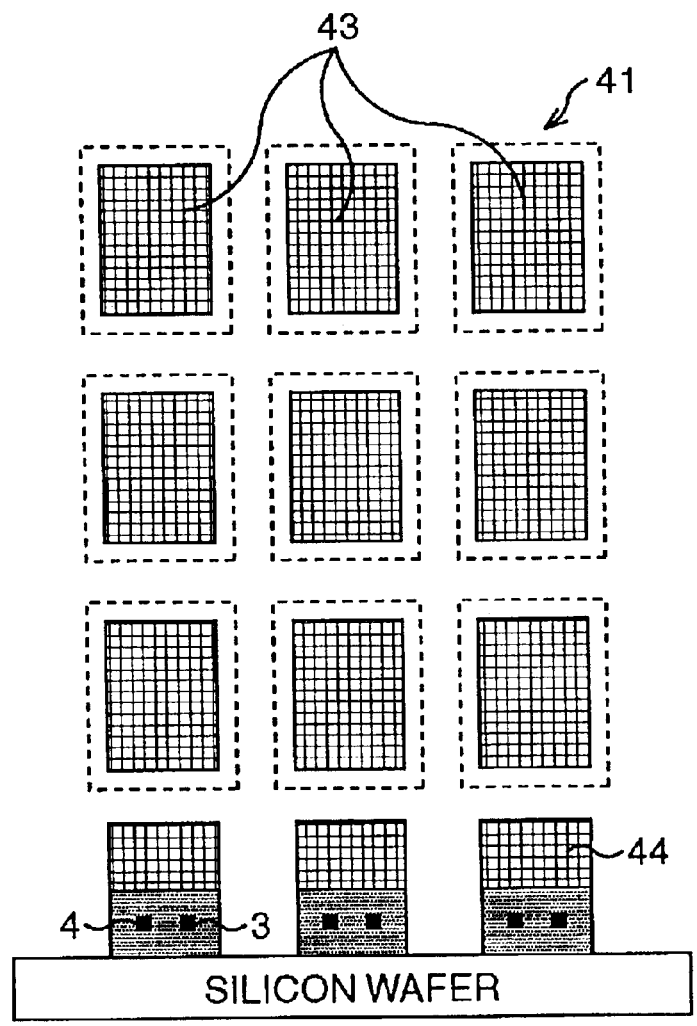
FIG. 10 is a block diagram showing the state in which the respective optical switching elements are cut out from the silicon semiconductor substrate subsequent to FIGS. 9A and 9B.

Subsequently, as shown in FIG. 10, with the resist masks 44 as masks, the oxide film and EPDs 9 and the like existing around the element regions 43 are removed by etching. Here, when the oxide film and the EPDs 9 are different in etching selection ratio, step etching may be performed, in other words, the oxide film is first etched and thereafter the EPDs 9 are etched.

Figure 11A:
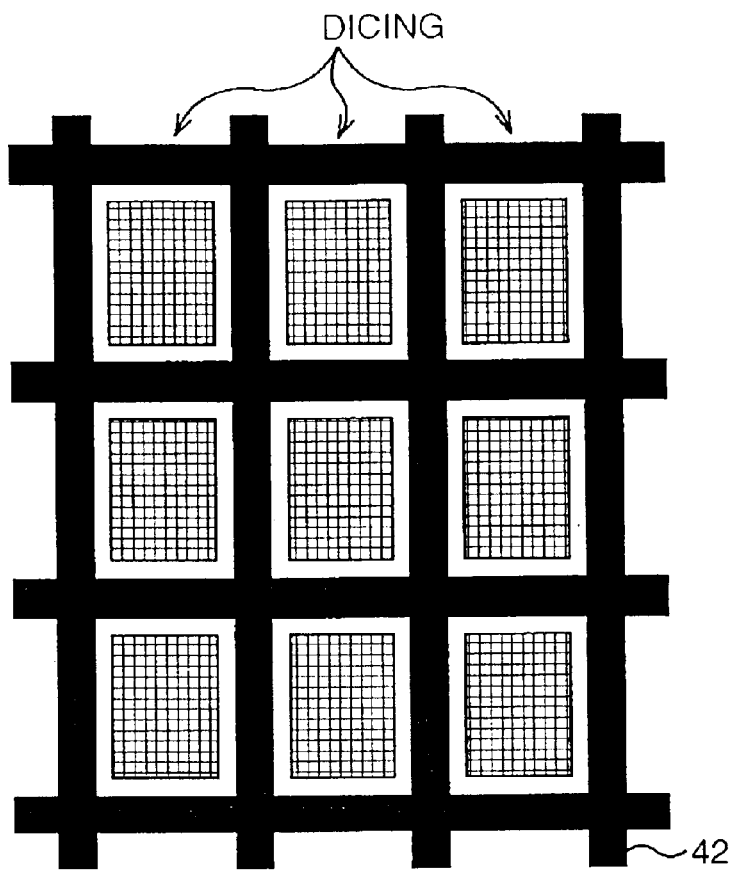
FIGS. 11A to 11C are block diagrams showing the state in which the respective optical switching elements are cut out from the silicon semiconductor substrate subsequent to FIG. 10.
Figure 11B:
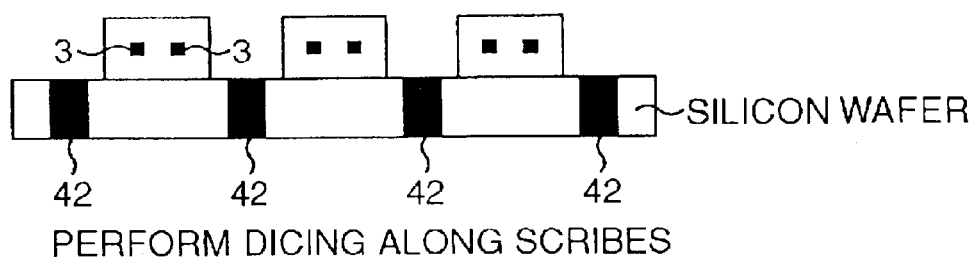
Figure 11C:
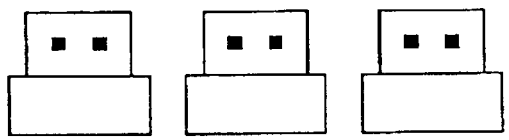

Thereafter, the resist masks 44 are removed by ashing or the like, and then the respective optical switching elements 41 are cut out by dicing at the scribe regions 42 as shown in FIGS. 11A to 11C (FIG. 11A is a plane view, FIG. 11B is a cross-sectional view, and FIG. 11C is a cross-sectional view showing the respective elements after separation). It is preferable to perform the etching here so that the scribe regions 42 become wider than the width of a blade of a dicer to prevent the blade from coming into contact with side faces of the optical switching elements, thus giving no broken faces to the switching elements.

As has been described, according to this embodiment, the cores 3 are formed to have a desired uniform refractive index using the CVD method by adjusting at least one of the additional amount of oxygen, the additional amount of nitrogen, and the additional amount of silicon of the source gas. This realizes the cores 3 having a uniform impurity concentration and film thickness distribution as compared with the case of using the conventional flame hydrolysis deposition method and adjusting the refractive index by adding an impurity such as $TiO_2$, $GeO_2$, or the like, thus enabling achievement of a desired refractive index difference between the cores 3 and the clads 2 and 4 with ease and accuracy. Further, by providing the EPDs 9 in the lower clad 2, the cores 3 can be pattern formed on the lower clad 2 with ease and accuracy even when the clads 2 and 4 and the cores 3 are made of similar materials, resulting in a highly reliable optical switching element.

MODIFIED EXAMPLES

Hereinafter, various modified examples of this embodiment will be described. A configuration of an optical switching element and a manufacturing method thereof will be described concurrently here for convenience. Note that the same numerals are assigned to the same components and so on as those in the above-described embodiment.

Modified Example 1

In this modified example 1, a configuration of an optical switching element and a manufacturing method thereof are disclosed similarly to the embodiment. This technique is suitably applied to the case in which a photoresist cannot stand etching in pattern forming cores because a core material is relatively thicker than that of the embodiment.

FIGS. 12A to 12E are schematic cross-sectional views mainly showing steps different from those in the embodiment of the method for manufacturing the optical switching element according to the modified example 1.

Figure 12A:
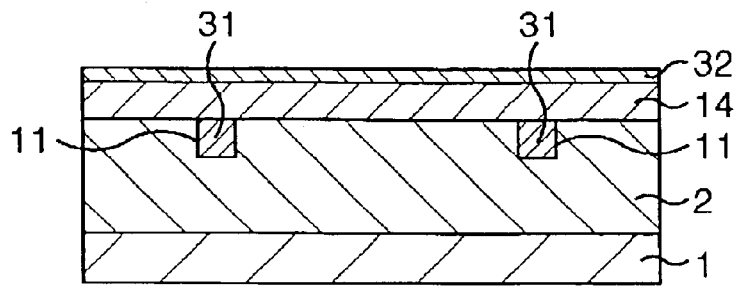
FIGS. 12A to 12E are schematic cross-sectional views mainly showing steps different from those in the embodiment of a method for manufacturing an optical switching element according to a modified example 1.

First, as shown in FIG. 12A, a silicon oxide film is deposited to a film thickness of about 15 $\mu$m on a silicon semiconductor substrate 1 by the plasma enhanced CVD method or the thermal CVD method as in the embodiment to form a lower clad 2 (refractive index: about 1.46), and thereafter recesses 11 (vias or grooves) are pattern formed to a depth of about 0.4 $\mu$m in the surface layer of the lower clad 2.

Subsequently, a silicon nitride film or a polycrystalline silicon film is deposited on the lower clad 2 to fill in the recesses 11 and is flattened by the CMP method with the surface of the lower clad 2 as a stopper, thus forming EPDs 31 composed of the silicon nitride film or the polycrystalline silicon film filled only in the recesses 11. The silicon nitride film or the polycrystalline silicon film is filled in the recesses 11 here in contrast to the EPDs 9 in the embodiment. This is because there is a need to form the EPDs of a material different from that of a later-described metal thin film in consideration of sufficient securement of a function of the EPDs 31 as etching stoppers.

Subsequently, a silicon oxynitride film 14 (refractive index: about 1.51) becoming a core material is deposited to a film thickness of about 0.25 $\mu$m by the plasma enhanced CVD method using high density plasma on the lower clad 2 with the EPDs 31 formed in its surface layer. In this case, a mixed gas containing $SiH_4$ (or TEOS), $N_2O$, and $N_2$ is used as a source gas, and an impurity is added thereto as required as in the embodiment.

Subsequently, a metal thin film substituting as the photoresist in etching, an Al film 32 here, is formed on the silicon oxynitride film 14 by the sputtering method.

Figure 12B:
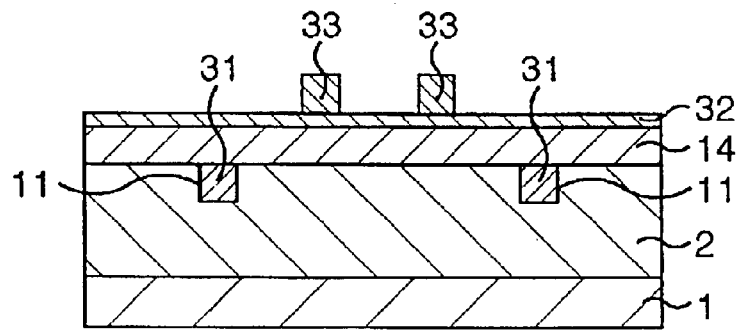

Subsequently, as shown in FIG. 12B, a photoresist is applied onto the Al film 32 and processed into core shapes by photolithography, thus forming resist masks 33.

Figure 12C:
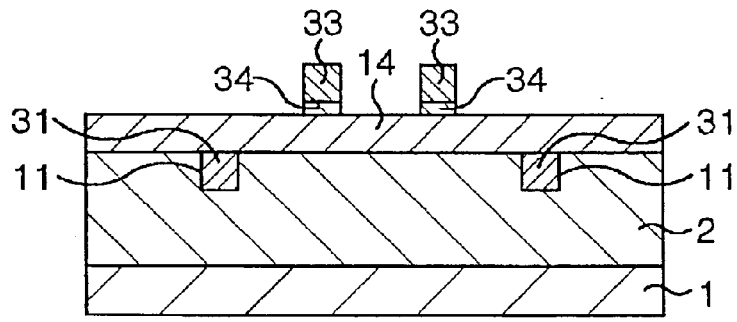

Subsequently, as shown in FIG. 12C, with the resist masks 33 as masks, the Al film 32 is dry etched to be processed into the core shapes after the resist masks 33, thus forming Al masks 34.

Figure 12D:
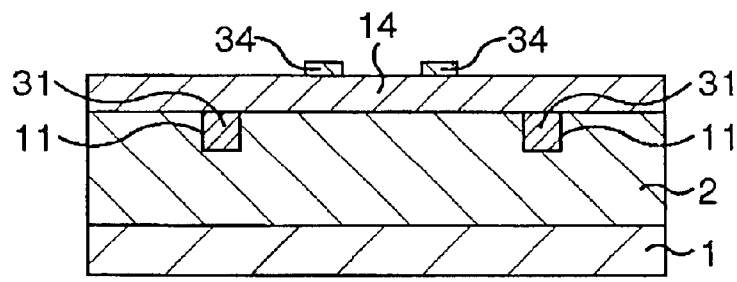

Subsequently, as shown in FIG. 12D, after the resist masks 33 are removed by ashing or the like, the silicon oxynitride film 14 is etched by plasma dry etching with the Al masks 34 as masks to pattern form the cores 3 in desired shapes. Here, the EPDs 31 are used as etching stoppers in this etching. More specifically, after the silicon oxynitride film 14 at positions where the cores 3 are not to be formed is etched to expose the EPDs 31, plasma reaches the EPDs 31 to cause a change in intensity of light emission and light wavelength. By detecting this change, completion of the etching is recognized. Since the Al film with a much higher etching speed than that of a photoresist is used as etching masks in this etching, the etching can be sufficiently performed even when the core material has a large thickness. In addition, the Al masks 34, which are made of a material different from those of the EPDs 31, have no possibility of interfering with the detection of the change in the intensity of light emission and the light wavelength in this event. Then, the etching is ended after over etching is performed a little for the same purpose as that of the embodiment.

Figure 12E:
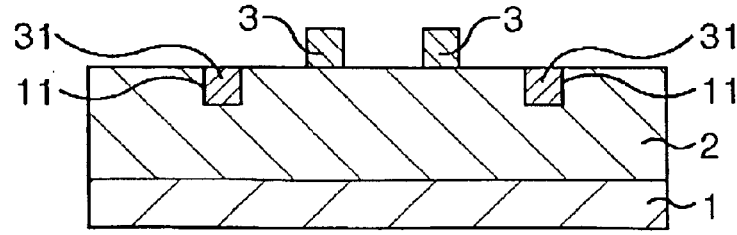

Subsequently, as shown in FIG. 12E, the Al masks 34 are removed by wet etching or the like, thus completing the cores 3.

Thereafter, through the same steps as those in FIGS. 4A to 4C to FIGS. 7A and 7B of the embodiment, the optical switching element is completed.

As has been described, according to the modified example 1, the cores 3 are formed to have a desired uniform refractive index using the CVD method by adjusting at least one of the additional amount of oxygen, the additional amount of nitrogen, and the additional amount of silicon of the source gas. This realizes the cores 3 having a uniform impurity concentration and film thickness distribution as compared with the case of using the conventional flame hydrolysis deposition method and adjusting the refractive index by adding an impurity such as $TiO_2$, $GeO_2$, or the like, thus enabling achievement of a desired refractive index difference between the cores 3 and the clads 2 and 4 with ease and accuracy. Further, by providing the EPDs 31 in the lower clad 2 and further using the metal thin film as the etching masks, the cores 3 can be patterned formed on the lower clad 2 with ease and accuracy even when the clads 2 and 4 and the cores 3 are made of similar materials and the core material is thick, resulting in a highly reliable optical switching element.

Modified Example 2

In this modified example 2, a configuration of an optical switching element and a manufacturing method thereof are disclosed similarly to the embodiment, but is different in a method for forming a core.

FIGS. 13A to 13D and FIGS. 14A and 14B are schematic cross-sectional views mainly showing steps different from those in the embodiment of the method for manufacturing the optical switching element according to the modified example 2.

Figure 13A:
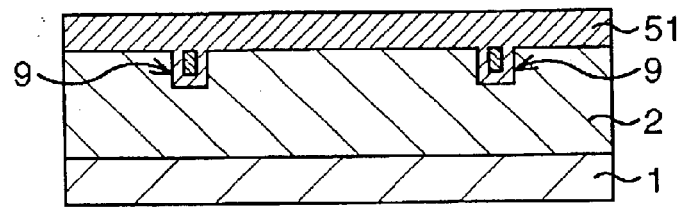
FIGS. 13A to 13D are schematic cross-sectional views mainly showing steps different from those in the embodiment of a method for manufacturing an optical switching element according to a modified example 2.

First, as shown in FIG. 13A, a silicon oxide film is deposited to a film thickness of about 15 $\mu$m on a silicon semiconductor substrate 1 by the plasma enhanced CVD method or the thermal CVD method as in the embodiment to form a lower clad 2 (refractive index: about 1.46), and thereafter recesses 11 (vias or grooves) are pattern formed to a depth of about 0.4 μm in the surface layer of the lower clad 2. Metal thin films, layered films of a TiN film 12 and a W film 13 here, are deposited on the lower clad 2 to fill in the recesses 11.

Subsequently, the TiN film 12 and the W film 13 are flattened by the CMP method with the surface of the lower clad 2 as a stopper to form EPDs 9 composed of the TiN film 12 and the W film 13 filled only in the recesses 11.

Subsequently, a metal thin film, a TiN film 51 here is formed to a film thickness of about 0.25 μm.

Figure 13B:
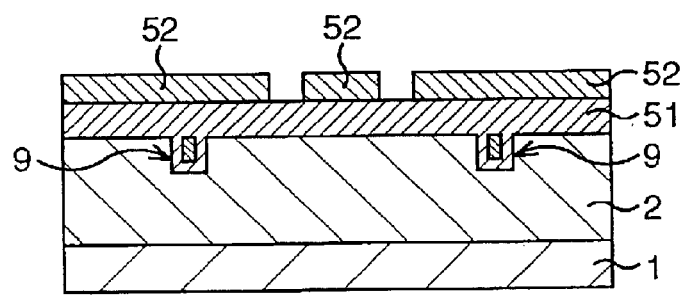

Subsequently, as shown in FIG. 13B, a photoresist is applied onto the TiN film 51 and processed to have grooves in core shapes by photolithography, thus forming a resist mask 52.

Figure 13C:
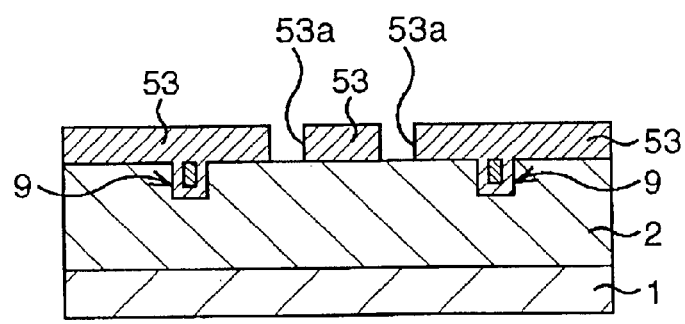

Subsequently, as shown in FIG. 13C, the TiN film 51 is dry etched with the resist mask 52 as a mask to be processed into the core shapes after the resist mask 52, thus forming a TiN mask 53 having grooves 53a in core shapes. Thereafter, the resist mask 52 is removed by ashing or the like.

Figure 13D:
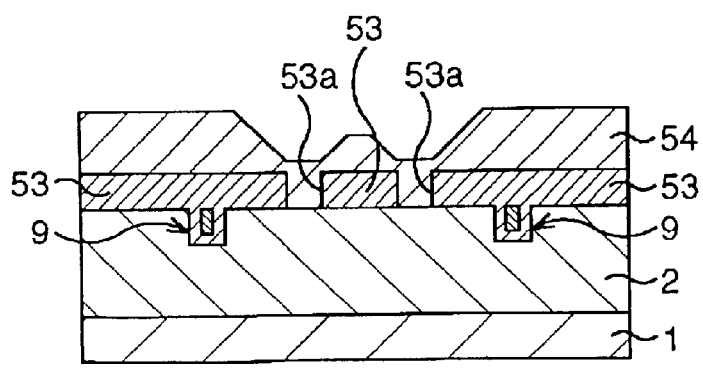

Subsequently, as shown in FIG. 13D, a silicon oxynitride film 54 (refractive index: about 1.51) becoming a core material is deposited by the plasma enhanced CVD method using high density plasma to fill the grooves 53a and cover the TiN mask 53. In this case, a mixed gas containing $SiH_4$ (or TEOS), $N_2O$, and $N_2$ is used as a source gas, and an impurity is added thereto as required as in the embodiment.

Figure 14A:
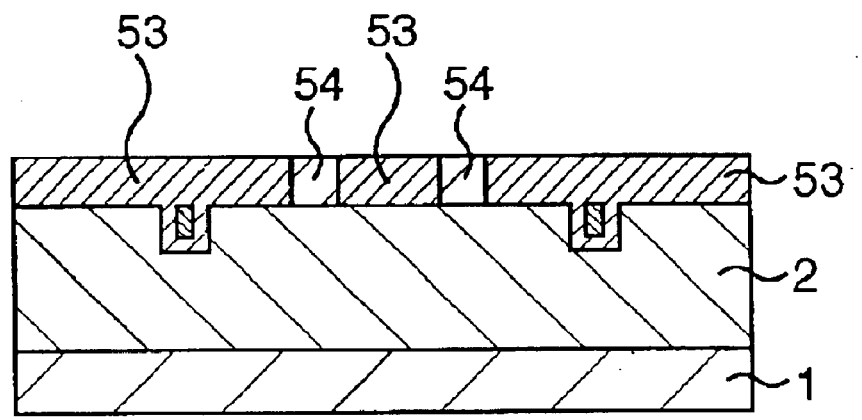
FIGS. 14A and 14B are schematic cross-sectional views mainly showing steps different from those in the embodiment of the method for manufacturing the optical switching element according to the modified example 2 subsequent to FIGS. 13A to 13D.

Subsequently, as shown in FIG. 14A, the silicon oxynitride film 54 is polished by the CMP method with the TiN mask 53 as a stopper. In this event, the silicon oxynitride film 54 remains to fill the grooves 53a.

Figure 14B:
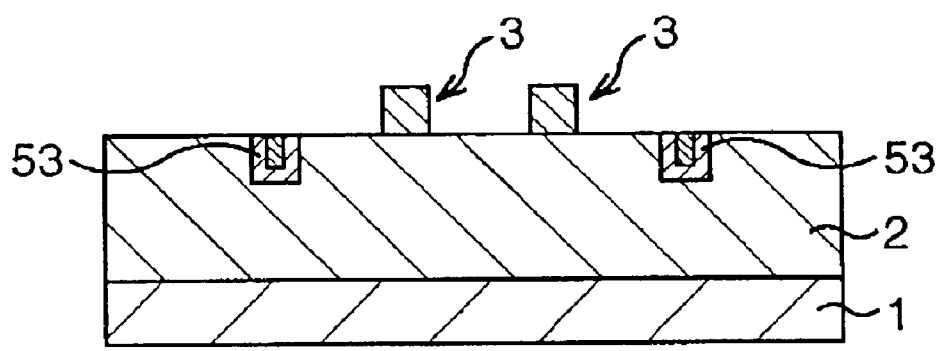

Subsequently, as shown in FIG. 14B, the TiN mask 53 is removed by wet etching or the like, thus pattern forming the cores 3 on the lower clad 2.

Thereafter, through the same steps as those in FIGS. 4A to 4C to FIGS. 7A and 7B of the embodiment, the optical switching element is completed.

As has been described, according to the modified example 2, the cores 3 are formed to have a desired uniform refractive index using the CVD method by adjusting at least one of the additional amount of oxygen, the additional amount of nitrogen, and the additional amount of silicon of the source gas. This realizes the cores 3 having a uniform impurity concentration and film thickness distribution as compared with the case of using the conventional flame hydrolysis deposition method and adjusting the refractive index by adding an impurity such as $TiO_2$, $GeO_2$, or the like, thus enabling achievement of a desired refractive index difference between the cores 3 and the clads 2 and 4 with ease and accuracy. Further, by providing the EPDs 9 in the lower clad 2 and further adopting a technique of forming the cores 3 in a self alignment manner using the TiN film 53 having the grooves 53a in core shapes, even thick cores 3 can be formed on the lower clad 2 with ease and accuracy even when the clads 2 and 4 and the cores 3 are made of similar materials, resulting in a highly reliable optical switching element.

According to the present invention, it becomes possible to form a core with a desired uniform refractive index and to achieve a desired refractive index difference between the core and a clad. Further, it also becomes possible to pattern form the core on a lower clad with ease and accuracy even when the clad and the core are made of similar materials, resulting in a highly reliable optical switching element.

The present embodiment is to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. An optical switching element, comprising:
   a clad formed on a semiconductor substrate; and
   cores covered with said clad and made to have a higher refractive index than that of said clad to form optical paths,
   wherein said clad has a lower clad and an upper clad so that said upper clad covers said cores formed on said lower clad, and
   wherein said lower clad has in a surface layer thereof etching stoppers made of a material different from that of said lower clad.

2. The optical switching element according to claim 1, further comprising:
   heaters for changing and controlling the optical paths by heating said cores.

3. The optical switching element according to claim 1, wherein said etching stoppers are made by filling recesses formed in the surface layer of said lower clad with a material different from that of said lower clad.

4. A method for manufacturing an optical switching element, comprising:
   a first step of forming a lower clad on a semiconductor substrate by a chemical vapor deposition method;
   a second step of forming cores becoming optical paths by depositing a core material on said lower clad by the chemical vapor deposition method and processing said core material; and
   a third step of forming an upper clad to cover said cores by the chemical vapor deposition method,
   wherein in said second step, said cores are formed and controlled to have a desired refractive index being a higher refractive index than those of said lower clad and said upper clad by said chemical vapor deposition method with a flow rate of a source gas being adjusted;
   wherein in said second step, said cores are formed by forming on said lower clad a thin film having grooves in said core shapes, filling said core material in said grooves, and thereafter removing said thin film.

5. The method for manufacturing an optical switching element according to claim 4, wherein said core material is a silicon oxynitride film, and a flow rate of at least one of a gas contributing to addition of oxygen, a gas contributing to addition of nitrogen, and a gas contributing to addition of silicon of said source gas is adjusted.

6. The method for manufacturing an optical switching element according to claim 5, wherein said source gas is a mixed gas containing $SiH_4$, $N_2O$, and $N_2$, and a flow rate of at least one of $SiH_4$, $N_2O$, and $N_2$ is adjusted.

7. The method for manufacturing an optical switching element according to claim 5, wherein said source gas is a mixed gas containing $Si(OC_2H_5)_4$, $N_2O$, and $N_2$, and a flow rate of at least one of $Si(OC_2H_5)_4$, $N_2O$, and $N_2$ is adjusted.

8. The method for manufacturing an optical switching element according to claim 6, wherein said mixed gas contains as an impurity at least one selected from $NH_3$, $B_2H_6$, $B(OCH_3)_3$, $PH_3$, and $PO(OCH_3)_3$.

9. The method for manufacturing an optical switching element according to claim 4, wherein in said second step, said chemical vapor deposition method is a plasma enhanced chemical vapor deposition method or a thermal chemical vapor deposition method.

10. The method for manufacturing an optical switching element according to claim 4, further comprising:
   after said third step, a fourth step of forming on said upper clad heaters for changing and controlling the optical paths by heating said cores.

11. The method for manufacturing an optical switching element according to claim 4, wherein in said second step, said cores are formed by forming a metal film on said core material, processing said metal film into core shapes, processing said core material with said metal films as masks, and thereafter removing said metal films.

12. A method for manufacturing an optical switching element, comprising:
   a first step of forming a lower clad on a semiconductor substrate;
   a second step of forming in a surface layer of said lower clad etching stoppers made of a material different from that of said lower clad;
   a third step of forming cores becoming optical paths with a higher refractive index than those of said lower clad and an upper clad by depositing a core material on said lower clad and processing said core material using said etching stoppers as a reference of etching; and
   a fourth step of forming said upper clad to cover said cores.

13. The method for manufacturing an optical switching element according to claim 12, wherein in said first step, said third step, and said fourth step, said lower clad, said core material, and said upper clad are formed by a chemical vapor deposition method.

14. The method for manufacturing an optical switching element according to claim 13, wherein said chemical vapor deposition method is a plasma enhanced chemical vapor deposition method or a thermal chemical vapor deposition method.

15. The method for manufacturing an optical switching element according to claim 13, wherein in said third step, said core material is formed by a plasma enhanced chemical vapor deposition method using high density plasma.

16. The method for manufacturing an optical switching element according to claim 13, wherein in said third step, said cores are formed and controlled to have a desired refractive index by depositing said core material by said chemical vapor deposition method with a flow rate of a source gas being adjusted and processing said core material.

17. The method for manufacturing an optical switching element according to claim 16, wherein said core material is a silicon oxynitride film, and a flow rate of at least one of a gas contributing to addition of oxygen, a gas contributing to addition of nitrogen, and a gas contributing to addition of silicon of said source gas is adjusted.

18. The method for manufacturing an optical switching element according to claim 17, wherein said source gas is a mixed gas containing $SiH_4$, $N_2O$, and $N_2$, and a flow rate of at least one of $SiH_4$, $N_2O$, and $N_2$ is adjusted.

19. The method for manufacturing an optical switching element according to claim 17, wherein said source gas is a mixed gas containing $Si(OC_2H_5)_4$, $N_2O$, and $N_2$, and a flow rate of at least one of $Si(OC_2H_5)_4$, $N_2O$, and $N_2$ is adjusted.

20. The method for manufacturing an optical switching element according to claim 18, wherein said mixed gas contains as an impurity at least one selected from $NH_3$, $B_2H_6$, and $PH_3$.

21. The method for manufacturing an optical switching element according to claim 12, further comprising:
   after said fourth step, a fifth step of forming heaters on said upper clad for changing and controlling the optical paths by heating said cores.

22. The method for manufacturing an optical switching element according to claim 12, wherein in said third step, said cores are formed by forming on said lower clad a thin film having grooves in said core shapes, filling said core material in said grooves, and thereafter removing said thin film.

23. The method for manufacturing an optical switching element according to claim 12, wherein in said third step, said cores are formed by forming a metal film on said core material, processing said metal film into core shapes, processing said core material with said metal films as masks, and thereafter removing said metal films.

24. The method for manufacturing an optical switching element according to claim 12, wherein in said second step, said etching stoppers are formed by forming recesses in a surface layer of said lower clad and filling said recesses with a metal film, wherein said metal film is a material different from that of said lower clad.

25. The method for manufacturing an optical switching element according to claim 24, wherein in said second step, said etching stoppers are formed by forming recesses in the surface layer of said lower clad and filling said recesses with a material different from those of said metal film and said lower clad.

26. The method for manufacturing an optical switching element according to claim 12, wherein in said third step, when said core material is etched by a plasma dry etching method, the etching of said core material is ended by detecting a change in intensity of light emission or light wavelength caused by plasma reaching said etching stoppers.

27. The optical switching element according to claim 1, wherein said cores are formed of a silicon oxynitride and are controlled to have a desired refractive index by adjusting at least one of an additional amount of oxygen, an additional amount of nitrogen, and an additional amount of silicon.

28. The optical switching element according to claim 1, wherein said clad is made of a silicon oxide.

29. The optical switching element according to claim 1, wherein said cores contain boron or phosphorus as an impurity, and the refractive index is adjusted by an amount of said impurity.

30. The optical switching element according to claim 1, wherein said cores are formed by a chemical vapor deposition method using as a source gas a mixed gas containing $SiH_4$, $N_2O$, and $N_2$, with a flow rate of at least one of $SiH_4$, $N_2O$, and $N_2$ being adjusted.

31. The optical switching element according to claim 1, wherein said cores are formed by a chemical vapor deposition method using as a source gas a mixed gas containing $Si(OC_2H_5)_4$, $N_2O$, and $N_2$, with a flow rate of at least one of $Si(OC_2H_5)_4$, $N_2O$, and $N_2$ being adjusted.

32. The optical switching element according to claim 30, wherein said mixed gas contains as an impurity at least one selected from $NH_3$, $B_2H_6$, $B(OCH_3)_3$, $PH_3$, and $PO(OCH_3)_3$.

* * * * *